United States Patent

Callahan et al.

[11] Patent Number: 6,128,916
[45] Date of Patent: Oct. 10, 2000

[54] MEMBRANE TECHNOLOGY TO REMOVE NON-CONDENSABLE GASES FROM REFRIGERATION SYSTEMS

[75] Inventors: Richard A. Callahan, Isle La Motte; Kishore V. Khandavalli, S. Burlington, both of Vt.

[73] Assignee: Enerfex, Inc., Williston, Vt.

[21] Appl. No.: 09/200,872

[22] Filed: Nov. 27, 1998

Related U.S. Application Data

[60] Provisional application No. 60/066,859, Nov. 28, 1997.

[51] Int. Cl.⁷ ........................................ F25B 43/04
[52] U.S. Cl. ............................... 62/475; 62/512
[58] Field of Search ............... 62/475, 512, 95, 62/77

[56] References Cited

U.S. PATENT DOCUMENTS

| | | | |
|---|---|---|---|
| 3,131,548 | 5/1964 | Chubb et al. | 62/475 |
| 3,145,544 | 8/1964 | Weller | 62/475 |
| 3,277,659 | 10/1966 | Sylvan et al. | 62/475 |
| 5,044,166 | 9/1991 | Wijmans et al. | |
| 5,062,273 | 11/1991 | Lee et al. | 62/85 |
| 5,113,927 | 5/1992 | Kedar et al. | 165/278 |
| 5,241,837 | 9/1993 | Alberton, III | 62/475 |

FOREIGN PATENT DOCUMENTS

| | | | |
|---|---|---|---|
| 64-108102 | 11/1990 | Japan | 62/512 |
| 2-173973 | 2/1992 | Japan | 62/475 |
| 3-218529 | 3/1993 | Japan | 62/475 |

*Primary Examiner*—William Doerrler
*Assistant Examiner*—Meh Jones
*Attorney, Agent, or Firm*—Sughrue, Mion, Zinn, Macpeak & Seas, PLLC

[57] ABSTRACT

An apparatus and method are described for refrigeration employing a condenser, an evaporator, and a compressor, wherein a condenser vent is provided for exhausting accumulated mixtures of non-condensable gas, such as air, and refrigerant gas, wherein accumulated non-condensable gas mixed with refrigerant gas from the condenser vent is provided to a membrane separator comprising at least two chambers separated by a selective membrane, said chambers being a high pressure chamber to which the non-condensable gas mixed with refrigerant gas is supplied, and a low pressure chamber into which the refrigerant gas is selectively permeated through said selective membrane for reintroduction and reuse in the refrigeration cycle, and on said high pressure chamber of said membrane separator, a vent is provided to exhaust non-condensable gas-rich raffinate gas.

8 Claims, 1 Drawing Sheet

REFRIGERATION CYCLE WITH MEMBRANE SYSTEM

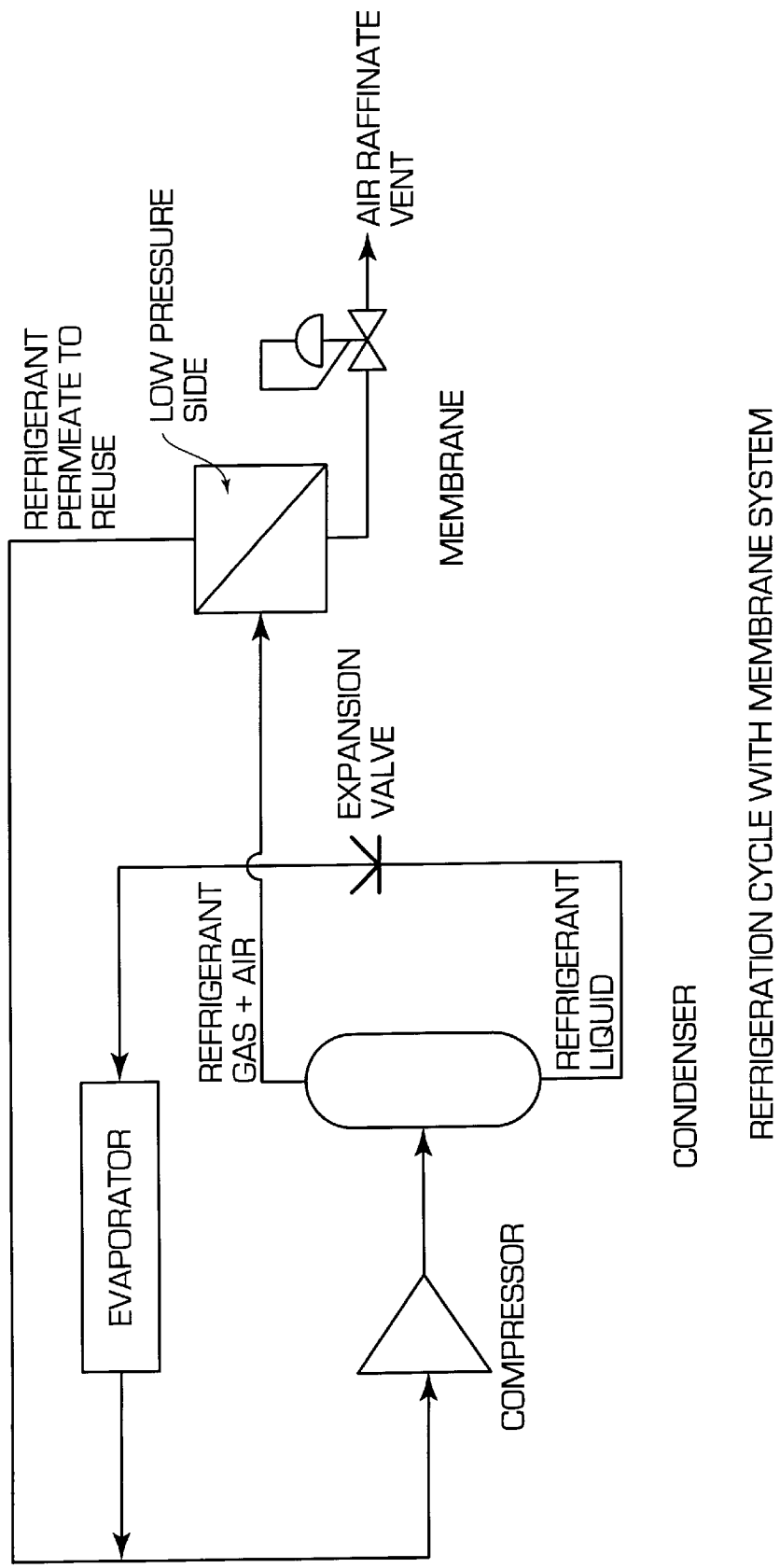
REFRIGERATION CYCLE WITH MEMBRANE SYSTEM

MEMBRANE TECHNOLOGY TO REMOVE NON-CONDENSABLE GASES FROM REFRIGERATION SYSTEMS

This application claims benefit of Provisional application Ser. No. 60/066,859 filed Nov. 28, 1997.

BACKGROUND OF THE INVENTION

Refrigeration is widely used in industry to achieve sub ambient temperatures. A common problem is leakage of non-condensable gases such as air into a refrigeration system during operation, increasing power consumption and causing excessive equipment wear. Presently, purgers are available to remove the entrapped non-condensable gases from refrigeration systems. These purgers require high initial investment, remove a part of the refrigerant along with the non-condensable gases, generate liquid and gaseous waste, and use corrosive acids to treat liquid waste water before disposal.

SUMMARY OF THE INVENTION

The present invention is a new technology that removes entrapped non-condensable gases such as air (gases that are not condensed at the operating conditions of the refrigeration system) by separating them from the refrigerant using polymeric membranes, and recycles the separated and purified refrigerant to the system.

By continuously purging non-condensable gases from the system, the membrane assures effective operation of the equipment and minimizes the energy consumption. The membrane needs substantially lower initial investment, has minimal operating costs, requires less space, and is very simple to operate. Furthermore, the proposed membrane recycles all or most of the refrigerant to the refrigeration cycle. It generates no or minimal waste. A variety of membrane materials are available that are highly suitable for the separation of various refrigerants from non-condensable gases such as air and hydrogen. For example, perfluorosulfonic acid polymer (e.g., Nafion®—a registered trademark of DuPont) has been found to be very effective for separating ammonia, a widely used refrigerant, from air.

DETAILED DESCRIPTION OF THE INVENTION

When a non-condensable gas such as ambient air leaks into a refrigeration system, it accumulates in the condenser. In such a case, the condenser operating pressure has to be increased to achieve the desired refrigerant liquefaction, which increases the refrigeration energy requirements. A 10 psi increase in the condenser pressure increases the power consumption by about 6%. For a 1,000 ton ammonia refrigeration system, the increase in energy consumption is about 60 kw. If the condenser pressure is increased by 20 psi, the energy consumption would be about 120 kw more. The energy consumption could be kept to a minimum by continuously removing unwanted non-condensable gases via a condenser vent from the refrigeration system. However, this non-condensable gas in the condenser vent would also have refrigerant associated with it.

In the present invention, accumulated non-condensable gas mixed with refrigerant gas from the condenser vent is fed to a membrane separator. Refrigerant gas is separated from the non-condensable gas and recovered in the membrane separator, and the non-condensable gas is vented to the atmosphere. The condenser vent, the feed to the membrane separation, is usually at an elevated pressure and temperature and may be further pressurized using a blower/fan/compressor and the temperature may be changed in a heat exchanger/heater/cooler to achieve optimum conditions required for efficient separation in the membrane separator. A vacuum pump may also be used on the low pressure permeate side of the membrane separator to improve the separation. The non-condensable gas and the refrigerant gas mixture is fed to the membrane separator to recover substantially all of the refrigerant gas on the low pressure permeate side Non-condensable gas is vented on the high pressure raffinate side of the membrane separator. Multiple stages can be used to achieve higher purity and recovery of refrigerant gas. Enriched refrigerant gas, recovered on the low-pressure side of the membrane separator, is recycled to the refrigerant compressor and condenser.

A variety of membrane materials are available that are highly suitable for refrigerant gas separation from non-condensable gases such as air. Flouropolymers are known to have compatible chemical characteristics and high selectivities for ammonia separation. For example, perfluorosulfonic acid polymer (e.g., Nafion®), is very selective for ammonia separation.

EXAMPLE EMBODIMENTS OF THE PRESENT INVENTION

Example 1

In an ammonia refrigeration system, the condenser vent gas composition contains as much as 75% ammonia by volume. The membrane system increases the ammonia purity and recycles the enriched ammonia to the refrigeration system. Essentially all of the ammonia can be recovered from the non-condensable gas using multiple membrane stages.

Example 2

In the ammonia synthesis process, nitrogen and hydrogen are reacted over a catalyst at elevated pressures to produce ammonia. The reaction does not achieve 100% completion in the reactor, and hence some of the reactant nitrogen and hydrogen are associated with the product ammonia. Product ammonia is usually separated by condensation. Membranes made from materials such as Nafion, that are highly selective for ammonia over non-condensable gases such as nitrogen and hydrogen can be used to separate these mixtures of ammonia, nitrogen and hydrogen. The products from the ammonia reactor are fed to a Nafion membrane where the ammonia is collected in the low pressure permeate side and un-reacted nitrogen and hydrogen are collected on the high pressure raffinate side and recycled to the reactor.

Example 3

In the steam reforming process, natural gas and steam are reacted at elevated temperature and pressure over a catalyst to form a mixture of carbon dioxide and hydrogen. In instances where the natural gas contains impurities such as nitrogen, the nitrogen impurity may react with the product hydrogen to form ammonia in the presence of the steam reforming catalyst. Nafion membrane can be utilized to separate the undesired ammonia from the products of the steam reforming process. The products from the steam reformer are fed to the Nafion membrane where the undesired ammonia is separated in the low pressure side of the membrane. Ammonia free high pressure gas mixture containing carbon dioxide and hydrogen can be utilized as required.

While the invention has been described in detail and with reference to embodiments thereof, it will be apparent to one skilled in the art that various changes and modifications can be made therein without departing from the spirit and scope thereof.

What is claimed is:

1. A method of refrigeration employing a condenser, an evaporator, and a compressor, wherein a condenser vent is provided for exhausting accumulated mixtures of non-condensable gas and refrigerant gas, wherein accumulated non-condensable gas mixed with refrigerant gas from the condenser vent is provided to a membrane separator comprising at least two chambers separated by a selective membrane, said chambers being a high pressure chamber to which the non-condensable gas mixed with refrigerant gas is supplied, and a low pressure chamber into which the refrigerant gas is selectively permeated through said selective membrane for reintroduction and reuse in the refrigeration cycle, and on said high pressure chamber of said membrane separator, a vent is provided to exhaust non-condensable gas-rich raffinate gas.

2. A method as in claim 1, wherein said non-condensable gas comprises air.

3. A method as in claim 2, wherein said mixture of air and refrigerant gas is pressurized using a blower/fan/compressor to provide a relatively high pressure on the raffinate side of the membrane of the membrane separator.

4. A method as in claim 3, wherein a vacuum is applied to the permeate chamber of the membrane separator.

5. A method as in claim 2, wherein a vacuum is applied to the permeate chamber of the membrane separator.

6. A method as in claim 1, wherein said mixture of air and refrigerant gas is pressurized using a blower/fan/compressor to provide a relatively high pressure on the raffinate side of the membrane of the membrane separator.

7. A method as in claim 6, wherein a vacuum is applied to the permeate chamber of the membrane separator.

8. A method as in claim 1, wherein a vacuum is applied to the permeate chamber of the membrane separator.

* * * * *